ELECTRO-MECHANICAL PLUGBOARD SEQUENCING APPARATUS

Filed May 9, 1960 3 Sheets-Sheet 1

INVENTORS
JOSEPH J. EACHUS
SAMUEL D. HARPER
BY Henry L. Hanson
ATTORNEY

ELECTRO-MECHANICAL PLUGBOARD SEQUENCING APPARATUS

Filed May 9, 1960 3 Sheets-Sheet 2

INVENTORS
JOSEPH J. EACHUS
SAMUEL D. HARPER

BY [signature]

ATTORNEY

Sept. 7, 1965 J. J. EACHUS ETAL 3,205,369

ELECTRO-MECHANICAL PLUGBOARD SEQUENCING APPARATUS

Filed May 9, 1960 3 Sheets-Sheet 3

INVENTORS
JOSEPH J. EACHUS
SAMUEL D. HARPER

BY Henry L. Hanson

ATTORNEY

United States Patent Office 3,205,369
Patented Sept. 7, 1965

3,205,369
ELECTRO-MECHANICAL PLUGBOARD SEQUENCING APPARATUS

Joseph J. Eachus, Cambridge, and Samuel D. Harper, Auburndale, Mass., assignors to Honeywell Inc., a corporation of Delaware Filed May 9, 1960, Ser. No. 27,884
6 Claims. (Cl. 307—88)

A general object of the present invention is to provide a new and improved electrical apparatus useful in the manipulation of a sequentially operated control circuit. More specifically, the invention is concerned with a new and improved sequencing control circuit which is characterized by its flexibility, simplicity and reliability in carrying out predetermined or preselected instructions.

In data processing circuitry, it is frequently necessary that certain data processing steps be carried out in a predetermined sequence. Such a sequence may well be of a repetitive type for different groups of information in a particular data processing problem. The need frequently arises, however, for there to be different combinations of operational steps performed in a data processing circuit for different data processing problems. The data processing performed with respect to any particular batch of data might well be related to the editing or the control of the interpretation of selected data bits which are being supplied to the utilization circuit. Thus, for example, a particular item of information may well contain several different statements or words, only some of which may be desired in connection with a particular data translation. Since it may be desirable to treat the same item of information in different ways, the availability of a flexible program changing device is important in the realizing of this objective.

Program plugboards or patchboards have been widely used to provide manually selected program steps for instructing tabulating and data processing systems. In accordance with the teachings of the present invention, a plugboard or patchboard has been combined with a unique sequencing mechanism so that a very flexible and very reliable control unit may be realized.

It is accordingly a further more specific object of the present invention to provide a new and improved selectively variable sequence controller comprising a combined plugboard or patchboard assembly with a unique sequencing mechanism.

The sequencing mechanism provided in the present invention takes the form of a plurality of saturable magnetic core devices having a plurality of control windings threading or coupled to the core devices to selectively control the saturation of all of the core devices except one, at any one particular instant. Also coupled to the core devices is a suitable drive signal source capable of changing the flux in any core device which is not saturated. A separate sense winding is associated with each core device so that the signal will appear thereon in the event that the associated core device is not saturated and is being driven by the drive signal source. By appropriately controlling the energization of the windings coupled to the core device, it is possible to sequence the non-saturated state from one core device to another in a predetermined manner. By appropriately relating the sense windings of the individual core devices to selective terminals on the plugboard or patchboard, it is possible to realize a flexible control circuit wherein it is possible to manually establish a predetermined sequence of operations and instructions for carrying out a particular control function.

It is accordingly a still further object of the invention to provide a new and improved sequencing circuit which comprises a plurality of saturable magnetic core devices which are adapted to be selectively saturated by a plurality of control windings coupled thereto and wherein a signal may be coupled through a preselected non-saturated core device to one or more terminals on an associated plugboard with the plugboard terminals being adapted to be manually connected in a predetermined manner for carrying out selected functions.

Another feature of the invention is the novel manner in which the apparatus is mechanically assembled in order to minimize the lengths of the sense wires used in the apparatus.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
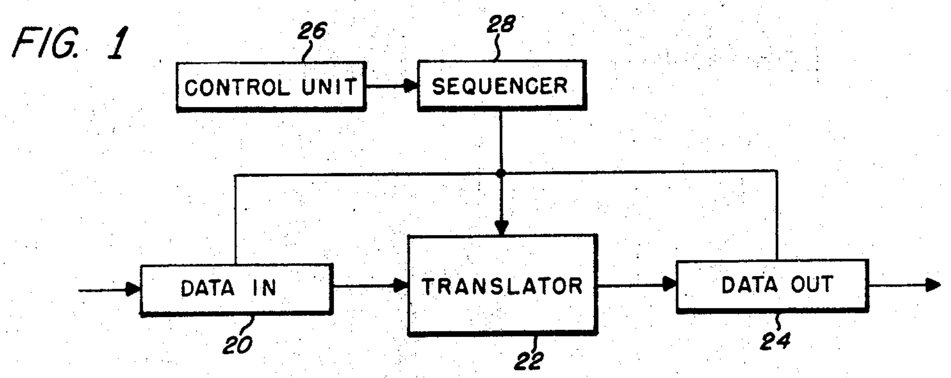
FIGURE 1 is a diagrammatic representation of one manner in which the present invention may be utilized.

Referring first to FIGURE 1, there is here represented a data manipulation circuit which might well incorporate the teachings of the present invention. The circuit illustrated comprises a data input register 20, a data translator 22, and a data output register 24. The operation of the data input register, the translator and the data output register is under the control of a control unit 26, which operates through an appropriate sequencer 28.

A typical operation for a circuit of the type illustrated in FIGURE 1 will be for information to be shifted into the data input register 20 in the form of a plurality of data bits which may be defined as a data word. In one form of the invention, the data word took the form of a series of forty-eight bits. The data bits in the input register 20 are adapted to be converted from an input code representation which might well be a binary coded decimal form of notation into an output notation suitable for punching a five-level, six-level, seven-level or eight-level code in a paper tape. The control unit, in cooperation with the sequencer, will cause the data input register in the translator to examine the appropriate number of bits, such as four bits for a binary coded decimal number, and the translator will produce on its output the particular code for which the translator has been designed, such as mentioned above.

In the event that all of the data in the input register 20 was in the form of binary coded decimal numbers, the sequencer may be programmed to examine all of the bits in the input register in four-bit combinations. In the event that the information in the input register is mixed alphabetic and numeric, it is necessary that the appropriate instructions be given to the translator by way of the sequencer to ensure that the numeric information is interpreted in four-bit combinations and the alphabetic information is interpreted in six-bit combinations.

By arranging the sequencer 28 with an appropriate plug board or patchboard, it is possibe for a manual operator or programmer to select in advance the particular combinations of bits that should be examined in the input register and in the translator. It is in this area of the sequencer wherein the present invention finds its principal place of application.

Figure 2:
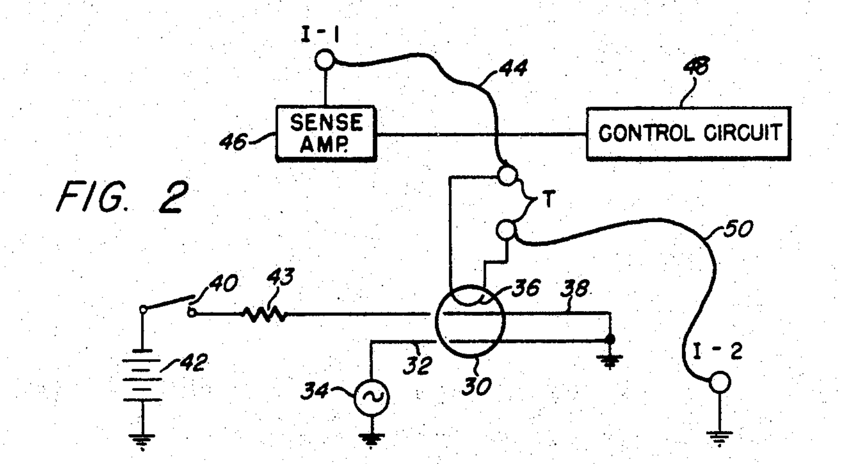
FIGURE 2 is a schematic representation of a single core device and associated circuitry as used in the present invention.

Referring next to FIGURE 2, there is here illustrated the basic circuitry associated with the sequencer of the present invention. The principl element of the sequencer takes the form of a magnetic core device 30. This core device is a saturable core device which may well have a rectangular hysteresis characteristic, although this is not necessarily required. Coupled to the core device 30 is a drive winding 32 which is adapted to receive a drive signal from a suitable drive source 34. Also coupled to the core device 30 is a sense winding 36, the latter being adapted to receive a signal from the drive winding 32 when the core device 30 is not saturated. A control winding 38 is coupled to the core device 30 and is adapted, when energized, to saturate the core device 30. The saturation current may be controlled by suitable switching means illustrated in FIGURE 2 as an electro-mechanical switch 40 which is in series with a battery 42 and a resistor 43.

The sense winding 36 is connected to a pair of terminals T. One of the terminals T is arranged for connection to a further terminal I–1 by way of a patchcord 44, the latter of which is adapted to be manually coupled into position. Connected to the terminal I-1 is a suitable sense amplifier 46, the latter of which is adapted to have an output for a suitable control circuit 48 capable of supplying the appropriate signals to a utilization device such as the translator 22 in FIGURE 1. The other terminal of the terminals T is connected to a grounded terminal I–2. The coupling is provided by a further manual patchcord 50.

When the switch 40 is closed, current will be flowing through the winding 38 and, consequently, the core device 30 will be saturated. The saturation of the core device 30 will prevent any drive signal from source 34 and winding 32 from being coupled into the output sense winding 36. When the switch 40 is opened, the core device 30 will not be saturated so that a signal may be coupled from the drive winding to the output sense winding 36. With the sense winding 36 connected in series to the input of the sense amplifier 46, it will be apparent that the sense amplifier will have an output indicative of the fact that a sense signal is being produced in the winding 36.

It will be apparent from the circuitry of FIGURE 2 that by utilizing a plurality of control windings, such as the winding 38, in combination with a plurality of additional magnetic core devices, that a non-saturated state may well be sequenced from one core device to another in accordance with the energization provided on the associated control windings. This type of circuitry is discussed in greater detail below in connection with FIGURE 4.

Figure 3:
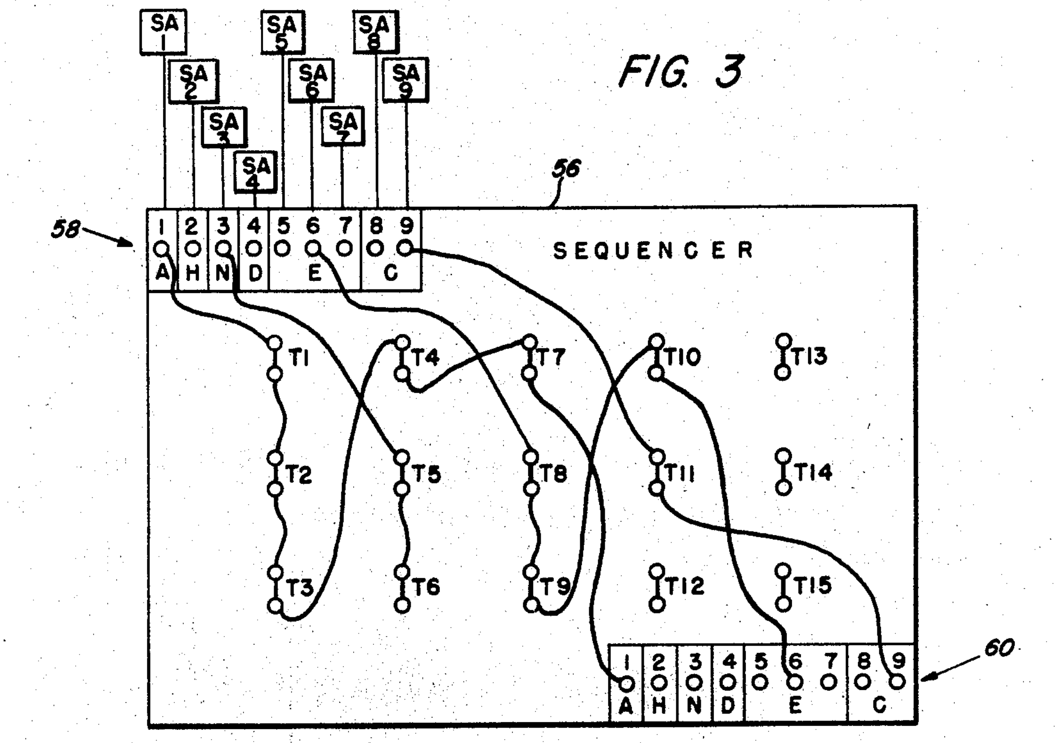
FIGURE 3 illustrates a patchboard or plugboard assembly.

Referring next to FIGURE 3, the plugboard or patchboard of the sequencer is illustrated. The patchboard may well be of the type having a basic panel 56 on which there are mounted a plurality of electrical terminals. On the upper surface of the panel 56, the plan view which is shown in FIGURE 3, there are a plurality of exposed terminals or connections illustrated by the numbered circles. A series of instruction terminals are provided at 58 and are numbered 1 through 9. A further set of instruction terminals 60 are provided to match instruction terminals 58. The latter set of terminals is utilized for completing the electrical circuits that may be established by way of the plugboard connections. The instruction terminals may be appropriately related to a series of sense amplifiers SA1 through SA9, each of which is connected to the instruction terminals 1 through 9. The control signals derived from the output of the sense amplifiers SA1 through SA9 will be adapted to provide the necessary translation in the translator 22. Instruction terminal

1 may well relate to an alphabetic translation in which event the instruction to the translator from the sense amplifier SA1, when a signal is detected thereon, will be to interpret six bits of information coming in from the input register 20 of FIGURE 1. The second instruction terminal may be referred to as a hexadecimal instruction terminal which would direct that four bits of information coming in from the input register should be interpreted in the translator as a hexadecimal number. The terminal 3 may be designated a numeric instruction terminal in which the bits in the input register related to this instruction would be interpreted as binary coded decimal numbers. The terminals 5, 6 and 7 may be designated as emitters wherein the activation of any one of the associated sense amplifiers will emit certain standard symbols or characters independently of the data coming in from the the input register. The terminals 8 and 9 may well be designated as the control instruction terminals which may initiate special operational steps which are likewise independent of the incoming data.

In order to determine when data shall be manipulated, when emitters shall be activated, or when control operations shall take place, it is necessary that the plugboard be manually plugged by the operator or programmer. It is assumed than any operation to be performed will be performed as a series of programmed steps, and these programmed steps must occur in some predetermined sequence. The sequence discussed herein is a conventional numeric sequence.

The actual sequencing will be such that the sequencing terminals on the board 56 will be activated in the order in which they are marked, and this will be with terminal T1 being activated first, followed by T2, on through T15. It will be noted that the terminals T1 through T15 are provided as pairs. The first pair of terminals T1 are actually connected together with the connection being provided by way of a sense winding threading a core of an associated sequencing circuit. Similarly, the adjacent terminals of each of the other terminal combinations T2 through T15 are likewise coupled to each other by way of sense windings coupled to an associated core device in the sequencing circuit.

In order that a particular instruction be related to a particular program sequence step, manual plugboard or patchcord connections are provided. Thus, if steps 1, 2, 3, 4 and 7 are to take the form of an alpha-numeric instruction, a manual plugging is made from the terminal 1 in the plugboard section 58 to the upper terminal T1, and then from the lower terminal of T1 to the upper terminal of T2. A similar patchcord connection is made from the lower terminal of T2 to the terminals of T3, T4 and T7. In order to terminate this particular instruction, if no further sequence steps are to be associated with this particular instruction, the lower terminal of T7 is coupled to the terminal 1 in the plugboard section 60.

If steps 5 and 6 are to be associated with a numeric instruction, these terminals T5 and T6 must be appropriately plugged in series between the terminal number 3 in the plugboard section 58 and the terminal number 3 in the section 60 by way of the terminals T5 and T6. Similarly, if a character emission is to be associated with steps 8, 9 and 10, the appropriate terminals must all be connected by suitable patchcords in the manner described above. A control signal for sequence step 11 may well be derived from the terminal 9 and, when appropriately coupled to the terminals T11, this particular instruction will become active at the appropriate time in the sequence.

Figure 4:
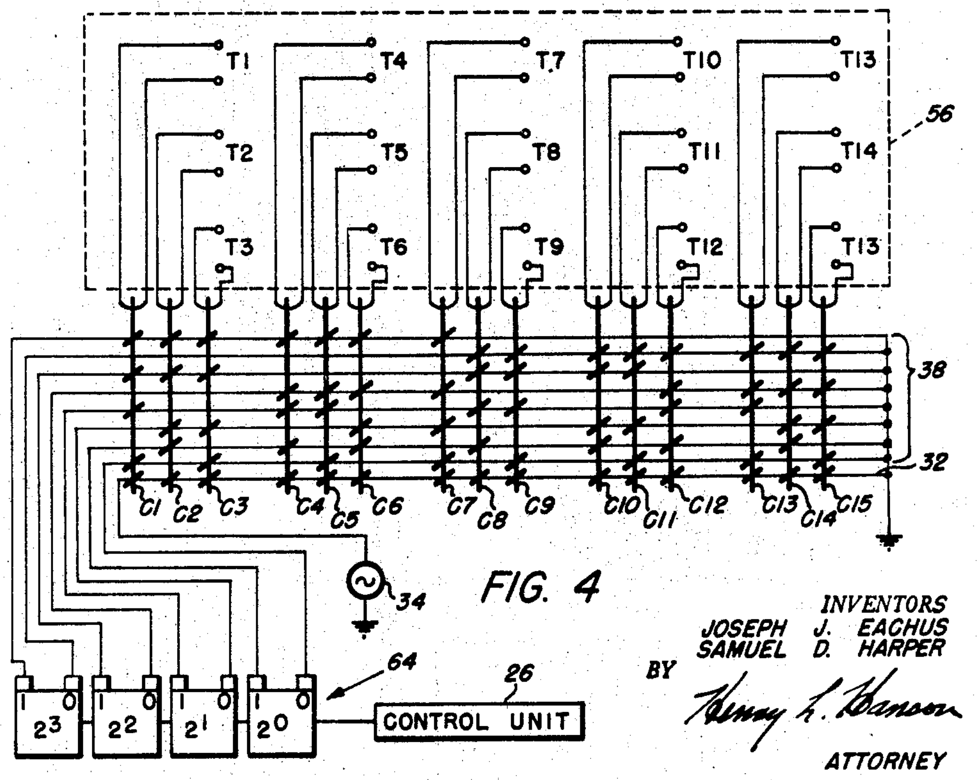
FIGURE 4 is a schematic representation of a complete sequencing circuit as it is adapted to be associated with the plugboard or patchboard illustrated in FIGURE 3.

The preferred manner for the implementation of the sequencing mechanism is illustrated in FIGURE 4. There is here provided a series of magnetic core devices C1 through C15, each of which is adapted to be of the saturable type. The core devices C1 through C15 may well be toroidal cores which may be conveniently threaded by single wires passing through the toroid. Each of the core devices C1 through C15 has a drive winding coupled thereto, as indicated by the slant coupling lines passing through the core and the winding at the junction point. A series of eight control windings are provided for the core devices, and they are selectively coupled thereto in accordance with a predetermined binary progression as also indicated by the slash coupling lines at the intersection of the core devices and the winding associated therewith. The control windings 38 are adapted to be energized by a suitable switching circuit shown in FIGURE 4 as a four-stage binary counter 64. Each of the four stages of the binary counter has two outputs, one of which is active when the associated counter stage is set to a "one" and the other of which is active when the associated stage is set to a "zero." The stepping of this binary counter 64 may be effected by a suitable control unit such as the control unit 26, as discussed above in connection with FIGURE 1.

Each of the core devices C1 through C15 also has its own separate sense winding. Each sense winding is appropriately coupled to the associated upper and lower terminals of the terminals T1 through T15.

It will be noted that the making of the manual connections as indicated in FIGURE 3 will be effective to connect the sense windings of the core devices C1, C2 and C3 in a series circuit when the appropriate patchcord connection has been made. Further, the series circuit will also include the sense windings of the cores C4 and C7. It will thus be apparent that if a signal is coupled into any one of these sense windings that the associated sense amplifier which is connected to this series circuit will be appropriately activated.

The actual sequencing will be effected by the control windings 38 as energized by the binary counter stages 64. Thus, when the binary counter stages 64 are set to a binary 1 or a 0001, there will be no saturating signals applied to the core device C1, but there will be saturating signals applied to all of the other cores C2 through C15. This will permit a signal from the driver 34 to be coupled through the core device C1 to the sense winding and thence to the terminals T1, where it may then be coupled by way of the patchcords to the sense amplifier SA1. When the control unit supplies the next stepping signal, the binary counter stages 64 will be set to a binary 2 or 0010. In this instance, the core C2 will be the only core of the combination which is not saturated and, consequently, a signal will be applied to the terminal T2. Similar stepping of the binary counter stage will be effective to select in numeric sequence the core devices C3 through C15. The number of steps that may actually be utilized in any particular program will, of course, be selectable by the operator and, as illustrated in FIGURE 3, only eleven steps have been provided in the particular program sequence. One of the functions that may well be activated by the operation of the control instruction related to the instruction terminal 9 in FIGURE 3 is the resetting of the counter stages 64 so that a new sequence may be initiated after step 11 has been performed.

It will be readily apparent that the described combination is extremely flexible in that the programmer can utilize a large number of steps of a single type of instruction, or he may intermix the instructions in any desired manner. In one particular embodiment of the invention, a total of six separate programs were provided in a single program board, with appropriate control functions for setting the counter stage 64 to start a sequence which is related to the particular program to be performed. It will be readily apparent that the principles explained above may well be applied to many other circuit configurations.

Figure 5:
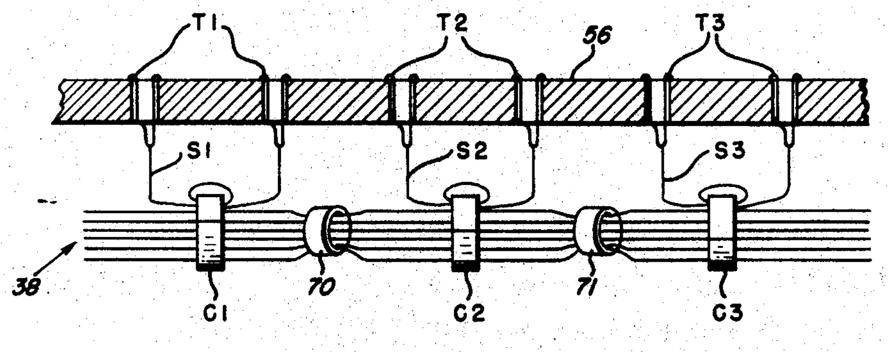
FIGURE 5 illustrates a representative mechanical assembly of the invention.

The mechanical assembly of the parts of the invention may be as illustrated in FIGURE 5. In this figure, the board 56 is shown in section with the terminal holes extending therethrough and with connecting terminals T1, T2 and T3 mounted therein. Cores C1, C2 and C3 are shown mounted below the board and mechanically supported by the sense wires S1, S2 and S3 which are connected to the terminals T1, T2 and T3 respectively. The control windings 38 are shown threading the cores C1, C2 and C3, and may be suitably bundled together by bindings 70 and 71. These windings are then carried by the cores on the back of the board.

This type of construction simplifies the assembly and wiring of the unit for the reason that the sense wires serve a dual purpose by supporting the cores and providing a short electrical connection to the terminals. In addition to simplifying the wiring, there is a cut-down of the noise and crosstalk that might otherwise be a problem if all of the sense wires were cabled to a remote location.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A data control circuit comprising a patchboard having a plurality of electrical program sequence terminals adapted to be manually connected in a predetermined order to a plurality of program instruction terminals, an electrical sequencer connected to said sequence terminals, said sequencer comprising a plurality of saturable magnetic core devices arranged one each for each pair of said sequence terminals, a plurality of saturating windings selectively coupled to said core devices, a plurality of switch means coupled to said winding so that for any one setting of said switch means all but one of said core devices will be saturated, automatically operative stepping means connected to said switch means to selectively energize said windings in a predetermined sequence to change the non-saturated state of a core device of said plurality of core devices from one core device to another, a drive winding coupled to all of said core devices and having a core flux changing signal thereon for changing the flux of any core device which is not saturated, a plurality of sense windings coupled one each to each of said core devices, means coupling each of said sense windings to a separate pair of said sequence terminals, and manually positioned connecting means positioned to selectively connect each of said pair of sequence terminals to a program instruction terminal.

2. A data control circuit comprising a patchboard having a plurality of electrical program sequence terminals adapted to be manually connected in a predetermined order to a plurality of program instruction terminals, an electrical sequencer connected to said sequence terminals, said sequencer comprising a plurality of saturable magnetic core devices arranged one each for each pair of said sequence terminals, a plurality of saturating windings selectively coupled to said core devices, a plurality of switch means coupled to said windings so that for any one setting of said switch means all but one of said core devices will be saturated, continuously operative stepping means connected to said switch means to selectively energize said windings in a predetermined sequence to change the non-saturated state of a core device of said plurality of core devices from one core device to another, a drive winding coupled to all of said core devices and having a core flux changing signal thereon for changing the flux of any core device which is not saturated, a plurality of sense windings coupled one each to each of said core devices, means coupling each of said sense windings to a separate pair of said sequence terminals, manually positioned connecting means positioned to selectively connect each of said pair of sequence terminals to a program instruction terminal, and an output control circuit connected to each of said program instruction terminals.

3. A data control circuit comprising a patchboard having a plurality of electrical program sequence terminals adapted to be manually connected in a predetermined order to a plurality of program instruction terminals, an electrical sequencer connected to said sequence terminals, said sequencer comprising a plurality of saturable magnetic core devices arranged one each for each pair of said sequence terminals, a plurality of saturating windings selectively coupled to said core devices, a plurality of switch means coupled to said windings so that for any one setting of said switch means all but one of said core devices will be saturated, sequentially operative stepping means connected to said switch means to selectively energize said windings in a predetermined sequence to change the non-saturated state of a core device of said plurality of core devices from one core device to another, a drive winding coupled to all of said core devices and having a core flux changing signal thereon for changing the flux of any core device which is not saturated, a plurality of sense windings coupled one each to each of said core devices, means coupling each of said sense windings to a separate pair of said sequence terminals, manually positioned connecting means positioned to selectively connect, in series, selected ones of said pairs of sequence terminals and a pair of said program instruction terminals.

4. In combination, a patchboard having a plurality of electrical program sequence terminals thereon and positioned to extend through said patchboard, an electrical sequencer comprising a plurality of magnetic core devices positioned on one side of said patchboard, a separate sense winding coupled to each of said core devices, each of said sense windings being mechanically connected to a pair of terminals on said one side of said patchboard and being wound on a separate one of said core devices to support said core devices directly on said one side of said patchboard, and a plurality of control windings positioned only on said one side of said patchboard and selectively threading said core devices, said core devices mechanically carrying and supporting said control windings on said patchboard.

5. A program sequencer comprising a patchboard having a plurality of electrical program sequence terminals thereon adapted to be selectively interconnected by way of movable terminals, an electrical sequencer comprising a plurality of magnetic core devices positioned on one side of said patchboard, a separate sense winding coupled to each of said core devices, each of said sense windings being mechanically positioned only on said one side of said patchboard and connected to a separate pair of terminals on said one side of said patchboard each said sense winding also being wound on a separate one of said core devices to support said core devices directly on said one side of said patchboard, and a plurality of control windings positioned only on said one side of said patchboard and selectively threading said core devices, said core devices mechanically carrying and supporting said control windings on said patchboard.

6. A control circuit comprising the combination of a patchboard having a plurality of paired electrical sequence terminals interconnected in a predetermined order to a pair of utilization terminals, said latter terminals connected to utilization means, sequencing means connected to said sequence terminals, said sequencing means comprising a plurality of saturable magnetic core devices each having a plurality of saturating windings coupled thereto, switching means connected to said plurality of saturating windings to selectively saturate all but one of said core devices, a drive winding coupled to all of said core devices and having periodically developed thereon a core flux changing signal adapted to change the flux of any core device which is not saturated, a plurality of sense windings coupled one each to each of said core devices, and means coupling each of said sense windings to a separate pair of said sequence terminals, said switching means being adapted to step the energization of said plurality of saturating windings in a predetermined manner to thereby shift the non-saturated state from one core device to another so as to initiate an output signal to that pair of sequence terminals associated with said interconnected pair of utilization terminals.

References Cited by the Examiner

UNITED STATES PATENTS

| | | | |
|---|---|---|---|
| 2,823,371 | 2/58 | Jones | 340—174 |
| 2,823,373 | 2/58 | Consalvi | 340—174 |
| 2,884,620 | 4/59 | Sepahban | 307—88 |
| 2,937,285 | 5/60 | Olsen | 307—88 |
| 2,954,731 | 10/60 | Durand et al. | 340—122.5 |
| 2,960,682 | 11/60 | French | 340—166 |
| 3,053,449 | 9/62 | Hoberg et al. | 340—172.5 |

IRVING L. SRAGOW, *Primary Examiner.*

EVERETT R. REYNOLDS, *Examiner.*